(12) United States Patent
Yu

(10) Patent No.: US 9,468,844 B1
(45) Date of Patent: Oct. 18, 2016

(54) METHOD FOR TRANSMITTING SIGNALS BETWEEN WEARABLE MOTION CAPTURE UNITS AND A VIDEO GAME ENGINE

(71) Applicant: Chun Hung Yu, Markham (CA)

(72) Inventor: Chun Hung Yu, Markham (CA)

(*) Notice: Subject to any disclaimer, the term of this patent is extended or adjusted under 35 U.S.C. 154(b) by 0 days.

(21) Appl. No.: 15/001,704

(22) Filed: Jan. 20, 2016

(51) Int. Cl.
*A63F 13/211* (2014.01)
*A63F 13/212* (2014.01)
*A63F 13/235* (2014.01)

(52) U.S. Cl.
CPC ............ *A63F 13/211* (2014.09); *A63F 13/212* (2014.09); *A63F 13/235* (2014.09)

(58) Field of Classification Search
CPC ...... A63F 13/20; A63F 13/21; A63F 13/211; A63F 13/212; A63F 2300/10; A63F 2300/105
USPC ............................................ 463/36; 345/156
See application file for complete search history.

(56) References Cited

U.S. PATENT DOCUMENTS

| | | | |
|---|---|---|---|
| 2008/0100588 A1* | 5/2008 | Nogami | G06F 3/016 345/173 |
| 2009/0069081 A1* | 3/2009 | Thorner | A63F 13/02 463/30 |
| 2015/0035743 A1* | 2/2015 | Rosener | G06F 3/014 345/156 |
| 2015/0084860 A1* | 3/2015 | Aleem | G06F 3/017 345/156 |

* cited by examiner

*Primary Examiner* — Allen Chan

(57) ABSTRACT

A method for transmitting signals between wearable motion capture units and a video game engine enables user body movement to be captured and inputted into a video game engine. The user wears a plurality of inertial measurement units (IMUs) as well as a plurality of vibration motors and a plurality of LEDs. The video game engine is able to provide haptic and visual feedback to the user via the plurality of vibration motors and the plurality of LEDs. Captured user body movement data is received through a plurality of slave microcontrollers and transmitted to a master microcontroller. The master microcontroller converts the user body movement data to video game engine-ready data. The video game engine-ready data is then converted by the video game engine to haptic and visual feedback response data and transmitted back to the master microcontroller.

9 Claims, 20 Drawing Sheets

Providing a connection wire for the master microcontroller

Electronically connecting the master microcontroller to the computing device through the connection wire

Complete Base Arduino Code

```
#include <LiquidCrystal.h>
#include <SoftwareSerial.h>
#include <Wire.h> //The I2C library
#include "TimerOne.h"

//*****************************************************************************//
//                       Arduino xBee_Base                                     //
//This program will periodically transmit each of the node addresses, then storing away //
//the data they send. Combining the data from the four nodes and sending it to unity //
//in one packet                                                                //
//                                                                             //
//Dec 12, 2015                                                                 //
//Written by: Patrick Ridley                                                   //
//*****************************************************************************//

LiquidCrystal lcd(12, 11, 5, 4, 9, 8); //Sets LCD pins for RS,RW, and D4 to D7 respectively
SoftwareSerial XBee(2, 3);             // RX, TX set to pins 2 and 3 respectively
int ledPin = 10;                       //sets LED pin int flag = 0;                          //Timer interrupt flag to determine next sensor read
int hitflag = 0;                       //Flag set when certain data sent from Unity char node_1[20] = "0:0:0";             //Initiates the character arrays to store sensor data in
char node_2[20] = "0:0:0";
char node_3[20] = "0:0:0";
char node_4[20] = "0:0:0";

int count = 0;                         //Count to increment in interrupt, used to determine
when to next read sensors
int count2;                            //count for timing to set hit LED off void setup()
{
  pinMode(ledPin, OUTPUT);             //sets ledpin
  lcd.begin(16, 2);
  Serial.begin (57600);
  XBee.begin(57600); //Opens xBee communication
  Timer1.initialize(70000);            //Initiates timer for every 70ms
  Timer1.attachInterrupt(callback); //Attatches interupt to 'callback' function
} void loop()
{
  int buffsize;
  char unityread[10];
  while (1)
  {
    buffsize = Serial.available();
    if (buffsize > 0)
    {
      Serial.readBytesUntil('\n', unityread, buffsize);
      if (unityread[0] = 'H')
      {
        hitflag = 1;
      }
    } if (hitflag == 1)
    {
      digitalWrite(ledPin, HIGH);
    }
    else  digitalWrite(ledPin, LOW);

if (flag == 1)  //Waits until next timed event to read
    {
      read_node('A', node_1);
      read_node('B', node_2);
      read_node('C', node_3);
      read_node('D', node_4);
      send_to_unity();               //Sends the new data out to unity through serial
      flag = 0;
    } if (count > 2)  //Controls how often the LCD is updated
    {
      lcd.clear();
```

FIG. 8A

```
        lcd.print(node_1);
        lcd.setCursor(0, 1);
        lcd.print(node_2);
        count = 0;
      }
    }
}
void send_to_unity(void)
{
  Serial.print(node_1);
  Serial.print(':');
  Serial.print(node_2);
  Serial.print(':');
  Serial.print(node_3);
  Serial.print(':');
  Serial.print(node_4);
  Serial.print(':');
  Serial.print('\n');
  Serial.print('\0');
} void read_node(char node_address, char *node_buffer)
{
  //This function takes the node address and transmits it through xBee.
  // It then Delays long enough for the node to send data back, if the data is valid it is stored
  int buff;
  char XBee_read[20];
  int i;
  XBee.print(node_address); //Transmits the address, if it matches the node will send data back
  delay(60);                //delays for time to recieve response back
  buff = XBee.available();  //checks the buffer size
  if (buff > 0)             //data available
  {
    XBee.readBytesUntil('\n', XBee_read, buff);
    if (XBee_read[0] == node_address)  //the first character sent back will be the nodes address,
to confirm the correct node responded
    {
      for (i = 1; i < (buff - 1); i++)
      {
        node_buffer[i - 1] = XBee_read[i]; //Reading the following data, shifting out address in
first data slot
      }
      for ( ; i < 20; i++)
      {
        node_buffer[i - 1] = 0;          //Clears the rest of the buffer from previous data
      }
    }
  }
}
void callback()
{
  count++;
  if (hitflag == 1)count2++;
  flag = 1;
  if (count2 > 5)
  {
    count2 = 0;
    hitflag = 0;
  }

Complete Sensor Node Code

```
#include <SoftwareSerial.h>
#include <wire.h> // I2C library
#include "TimerOne.h"

//**********************************************************************//
//                      Arduino xBee Sensor Node                        //
//This program will periodically read an accelerometer and gyroscope, taking these values //
//and calculating the current orientation of the entire unit.                            //
//when this arduino recieves its address (set on programing by the variable address1)    //
//it will then transmit back the devices oritentation angles to the Arduino Base.        //
//The data sent back is x and y rotations (0 to 360), along with a z rotation which is   //
//periodically set back to a reference of 180 degrees.                                   //
//                                                                                       //
//Dec 12, 2015                                                                           //
//written by: Patrick Ridley                                                             //
//**********************************************************************//
SoftwareSerial XBee(2, 3); // RX, TX; Allows xBee to emulate a serial port on pins 2 and 3 char address1 = 'D';
const int N = 50;       //Number of milliseconds between interrupts
unsigned int T;         // period between interrupts in microseconds   (max value of ~62000 ish due
to 16 bit data type)

int gyro[3];            //values read from sensor
int accel[3];           //values read from sensor float bias[3];          //calculated bias on bootup
float anglegyro[3];     //calculated angle from gyroscope
float angle[3];         //Angles to be sent back through xBee
float pastgyro[3];      //Previous gyroscope values
float force;            //Total force on device (1G ~= 250)

int flag;
float pitch;
float roll;
int count = 0;
int count2 = 0;

void setup()
{
  int i;
  T = N * 1000;    //Calculates period and frequency based on interrupt time XBee.begin(57600); //Opens xBee communication
  wire.begin();   //Opens I2C port
  ////Initialize sensors;
  //98Hz filter, 1Khz sample rate, 2000deg/s
  sendgyro(0x16, 0x1A);
  //Div = 9 -> Tsamp = (1+Div)/Sample rate =  (1+9)/1000 = 10ms here
  sendgyro(0x15, 0x09);

sendaccel(0x31, 0x09); // full range, +/- 4g
  sendaccel(0x2D, 0x09);

//Initially calculates the Gyroscope bias at rest and averages over 20 samples
  bias[0] = 0;
  bias[1] = 0;
  bias[2] = 0;
  for (i = 0; i < 20; i++)
  {
    readgyro();
    bias[0] += gyro[0];
    bias[1] += gyro[1];
    bias[2] += gyro[2];
  }
  bias[0] = bias[0] / 20;
  bias[1] = bias[1] / 20;
  bias[2] = bias[2] / 20;

Timer1.initialize(T);              //sets the interrupt period
  Timer1.attachInterrupt(callback);  //attatches interrupt to 'callback' function
} void loop()
{
```

FIG. 9A

```
    char xbee_read[20];
    int buff;
    byte data;

//Initializes the values for the angles in the gyroscopes
    pitch = atan2((accel[1]), ((accel[2])));
    pitch = pitch * 180 / (3.14);
    pitch += 180;
    roll = atan2((accel[0]), ((accel[2])));
    roll = roll * 180 / (3.14);
    roll += 180;
    readaccel();
    anglegyro[0] = pitch;
    anglegyro[1] = roll;

pastgyro[0] = gyro[0];
    pastgyro[1] = gyro[1];
    pastgyro[2] = gyro[2];

while (1)
    {
      //Checks for new xbee data recieved
      buff = XBee.available();
      if (buff >= 1)              //if data available
      {
        XBee.readBytesUntil('X', xbee_read, buff);
        if (xbee_read[0] == address1) //Checks if its device address was broadcast, if so then send back this nodes corresponding sensor data
        {
          //sends back the sensor data, first byte sent back though is this node address to tell base which sensor sent the data
          XBee.print(address1);
          XBee.print((int)angle[0]);
          XBee.print(":");
          XBee.print((int)angle[1]);
          XBee.print(":");
          XBee.print((int)angle[2]);
          XBee.print("\n");
        }
      }

//Checks for next sensor read condition
      if (flag == 1)
      {
        readaccel();
        readgyro();

gyroscope_calc();       //converts the gyroscope readings
        accelerometer_calc();   //converts the accelerometer readings
        device_angle_calc();    //calculates device angle based on these two measurements
        new_bias();             //updates the bias flag = 0;
      }

}
}
void new_bias(void)
{
    //This function will update the bias as the device is in operation, this is because the gyroscopes biasing will slowly change over time
    //to achieve this we check if the device is relatively static, if so then the gyroscope value is read and the bias is updated through a moving average filter
    //This filter will change slowly over time but is ideal to keep the value relatively static and unaffected if any bad readings do occur
    float gyro_change[3];
    float floataccel[3];
    floataccel[0] = accel[0];
    floataccel[1] = accel[1];
    floataccel[2] = accel[2];

//Total force is equal to the root of the sum of the squares of all the componants
    force = (floataccel[0] * floataccel[0]) + (floataccel[1] * floataccel[1]) + (floataccel[2] * floataccel[2]);
    force = sqrt(force);

//Calculates the change in the gyroscope readings since last time
    gyro_change[0] = gyro[0] - pastgyro[0];
    gyro_change[1] = gyro[1] - pastgyro[1];
    gyro_change[2] = gyro[2] - pastgyro[2];
```

FIG. 9B

```
//If the force is between these two values the device can be asusmed to be static
//force of gravity is always measured as between these values, meaning if its in this range
only gravity is affecting it
if ((int)force <250 & (int)force >240)
{
    if (fabs(gyro_change[0]) < 5) //if the gyroscope reading havnt changed much since the last
reading
    {
        bias[0] = 0.99 * bias[0] + 0.01 * gyro[0];    //the bias is updated through the moving
average filter, being affected by the new reading
    }
    if (fabs(gyro_change[1]) < 5)
    {
        bias[1] = 0.99 * bias[1] + 0.01 * gyro[1];
    }
    if (fabs(gyro_change[2]) < 5)
    {
        bias[2] = 0.99 * bias[2] + 0.01 * gyro[2];
    }
}

//Stores the old gyroscope values
pastgyro[0] = gyro[0];
pastgyro[1] = gyro[1];
pastgyro[2] = gyro[2];
} void device_angle_calc(void)
{
    //This approach uses a complimentary filter to combine the resulting angles given by
accelerometer and gyroscope data
    //Since the Gyroscope data is more stable during movements, the majority of the angle is coming
from this float floatangle[3];
    floatangle[0] = 0.98 * anglegyro[0];
    floatangle[0] = floatangle[0] + 0.02 * pitch;      //using complementary filter to combine gyro
and accelerometer data floatangle[1] = 0.98 * anglegyro[1];
    floatangle[1] = floatangle[1] + 0.02 * roll;

//Converts to integer for easy data sending
    angle[0] = (int) floatangle[0];
    angle[1] = (int) floatangle[1];

//accelerometer data isnt possible to measure 'z' rotation, so angle is based purely on the 'z'
gyroscope angle
    angle[2] = anglegyro[2];
} void accelerometer_calc(void)
{
    //Takes the read in acceleromater values and calculates the rotation of the device by the
change in x/y value with respect to the z.
    //Taking the inverse tan of x/z and y/z will give us the corresponding roll and pitch
respctively
    //offsets result by 180 degrees
    pitch = atan2((accel[1]), ((accel[2])));
    pitch = pitch * 180 / (3.14);
    pitch += 180;

roll = atan2((accel[0]), ((accel[2])));
    roll = roll * 180 / (3.14);
    roll += 180;
} void gyroscope_calc(void)
{
    //Takes the read in gyroscope values and will calculate the current angle based off the
gyroscopes angular velocity values float deltagyro[3];    //calculated differrence in read angle from bias, gives the change in
degrees
    //float angular_speed[3];
    //offsets the read value, by the bias amount and converts to degrees
    deltagyro[0] = (0.05 * ((float)gyro[0] - bias[0])) / 14.375;
    deltagyro[1] = (0.05 * ((float)gyro[1] - bias[1])) / 14.375;
```

FIG. 9C

```
    deltagyro[2] = (0.05 * ((float)gyro[2] - bias[2])) / 14.375;

//holds the running sum of the converted gyroscope values, this represents the current angle
    anglegyro[0] += deltagyro[0];
    anglegyro[1] -= deltagyro[1];
    anglegyro[2] += deltagyro[2];

//(UNUSED) uses the change current change in degrees to get an angular speed
    //angular_speed[0] = deltagyro[0] / 0.05; //quick estimation of angular speed bassed off change
 in value over time
    //angular_speed[1] = deltagyro[1] / 0.05;
    //angular_speed[2] = deltagyro[2] / 0.05;

//checks for if the angle went beyond the bounds of 0 to 360 and corrects it.
    if (anglegyro[0] > 360)
      anglegyro[0] = anglegyro[0] - 360;
    else if (anglegyro[0] < 0)
      anglegyro[0] = 360 - anglegyro[0];

if (anglegyro[1] > 360)
      anglegyro[1] = anglegyro[1] - 360;
    else if (anglegyro[1] < 0)
      anglegyro[1] = 360 - anglegyro[1];
} void sendgyro(byte reg, byte data)
{
    //Basic function that sends out the gyroscope address followed by a register and data
    //used  to set registers in the device
    Wire.beginTransmission(0x68); //
    Wire.write(reg);
    Wire.write(data);
    Wire.endTransmission();     // stop transmitting
} void readgyro(void)
{
    //This function reads the gyroscopes sensor values and stores them in the gyro[] variable.

int temp[6];
    int i;
    Wire.beginTransmission(0x68); //gyroscope address
    Wire.write(0x1D);              //Sends the starting register to read from
    Wire.endTransmission();        // sends a stop on to the bus //Requests the next 6 registers from the address
    Wire.requestFrom(0x68, 6, 1);
    //wait for response of all 6 registers
    if (Wire.available() == 6)
    {
      for (i = 0; i < 6; i++)
      {
        temp[i] = Wire.read();
      }
      //Concatinates 8 bit reigsters into one 16 bit value
      gyro[0] = (temp[0] << 8) | temp[1];
      gyro[1] = (temp[2] << 8) | temp[3];
      gyro[2] = (temp[4] << 8) | temp[5];
    }

} void sendaccel(byte reg, byte data)
{
    //Basic function that sends out the acceleromter address followed by a register and data
    //used  to set registers in the device
    Wire.beginTransmission(0x53); //
    Wire.write(reg);
    Wire.write(data);
    Wire.endTransmission();     // stop transmitting
} void readaccel(void)
{
    //This function reads the accelerometer sensor values and stores them in the accel[] global
 variable.
    int i;
```

FIG. 9D

```
  int temp[6];
  Wire.beginTransmission(0x53);

//sends starting register
  Wire.write(0x32);
  Wire.endTransmission();      // sends a stop onto the bus //requests the next 6 registers from address
  Wire.requestFrom(0x53, 6, 1);
  //wait for response of all 6 registers
  if (Wire.available() == 6)
  {
    for (i = 0; i < 6; i++)
    {
      temp[i] = Wire.read();

}
    accel[0] = (temp[1] << 8) | temp[0];
    accel[1] = (temp[3] << 8) | temp[2];
    accel[2] = (temp[5] << 8) | temp[4];
  }
} void read_I2C_bytes(int device, int reg, int *data, int bits)
{
  //Generic function to read I2C devices, didnt use in this code, but can simplify both the
accelerometer and gyroscope reading to both using this if needed
  int i;
  Wire.beginTransmission(device); //
  Wire.write(reg);
  Wire.endTransmission();      // stop transmitting Wire.requestFrom(device, bits, 1);
  //wait for response of all 6 registers
  if (Wire.available() == bits)
    for (i = 0; i < bits; i++)
    {
      data[i] = Wire.read();
    }
}

//Interupt
void callback()
{
  count++;
  count2++;
  flag = 1;

if (count2 > 30)
  {

//  if (accel[2] > 100 & accel[0] <150 & accel[0] > -150) //only update if z axis is
relativly close to ground plane (otherwise accel reading is often out of whack
  //  if (((int)force <255) & ((int)force >240) & (accel[2] >0))

//Periodically updates the gyroscope values to match the accelerometer angles, this prevents
gyroscope drift. But only doing this when the device is seen to be static so the accelerometer
angles can be trusted.
    if ((int)force < 255)    //Checks if the force on the device is relatively close to just
gravity (meaning a static position)
    {
      count2 = 0;
      if (((int)force > 240) & (accel[2] > 10)) //Only want to update the gyroscope value if z
axis is still experiance part of gravity, otherwise the angle is unreliable from accelerometer
      {
        anglegyro[0] = 0.5*anglegyro[0] + 0.5*pitch;
      }
      anglegyro[1] = 0.5*anglegyro[1] + 0.5*roll;
      anglegyro[2] = 180;    //resets the z axis to 180
    }

Complete Unity Serial Port Code

```csharp
using UnityEngine;
using System.Collections;
using System.IO;
using System.IO.Ports;
using System.Threading;

namespace ArduinoSerialInput
{
        /// <summary>
        /// Arduino Serial Input Class, for taking inputs from the Arduino controller.
        /// </summary>
        public class ArduinoInput
        {
                // constants for delimiter character, and ports
                private const char DELIM_CHARACTER = ':';

// class for input. include package and use static methods to access desired values.
                private static volatile ArduinoInput instance;

// array of senors, as vector 3 values.
                private volatile Vector3[] sensors;
                private int sensorReadCount = 0;

// serial port to read from. Values are arranged in form:
                //"<Sensor1X>:<Sensor1Y>:<Sensor1Z>:<Sensor2X>...:<Sensor3z>/n/0"
                private SerialPort serialPort;
                private Thread serialThread;

// bool for allowing thread to end on port close
                private bool runReadThread = false;

/// <summary>
                /// Singleton pattern constructor. Initializes the vector array for storage of values read from sensors.
                ///</summary>
                private ArduinoInput()
                {
                        // initalize sensor array
                        sensors = new Vector3[4];
                        for (int i = 0; i < 4; i++)
                        {
                                sensors[i] = new Vector3(-1, -1, -1);
                        }
                }

/// <summary>
                /// Gets the instance for Arduino Serial input. If an Arduino serial input instance does not exist,
                /// create one.
                /// </summary>
                /// <returns>The motion input.</returns>
                private static ArduinoInput GetArduinoInput()
                {
                        if (instance == null)
                                instance = new ArduinoInput();
                        return instance;
                }

/// <summary>
                /// Is the port open.
                /// </summary>
                /// <returns><c>true</c>, if the port is open, <c>false</c> otherwise.</returns>
                public static bool isPortopen()
                {
                        return (ArduinoInput.GetArduinoInput().serialPort != null);
                }

/// <summary>
                /// Opens the serial port.
                /// </summary>
                /// <param name="portName">Port name.</param>
                /// <param name="baudRate">Baud rate.</param>
                /// <exception cref="InvalidOperationException">Thrown if existing port is already open.</exception>
```

FIG. 10A

```
/// <exception cref="IOException">Thrown if error in opening port</exception>
/// <exception cref="OutOfMemoryException">Thrown if ReadThread could not be
created due
/// to lack of memory</exception>
public static void OpenSerialPort(string portName, int baudRate)
{
    ArduinoInput arduinoSerialInput = ArduinoInput.GetArduinoInput();
    // if port is closed create new port, set applicable values, open port,
and start read thread. Otherwise
    // throw exception.
    if (arduinoSerialInput.serialPort == null)
    {
        arduinoSerialInput.serialPort = new SerialPort(portName);

arduinoSerialInput.serialPort.BaudRate = baudRate;
        arduinoSerialInput.serialPort.Parity = Parity.None;
        arduinoSerialInput.serialPort.StopBits = StopBits.One;
        arduinoSerialInput.serialPort.DataBits = 8;
        arduinoSerialInput.serialPort.Handshake = Handshake.None;
        arduinoSerialInput.serialPort.ReadTimeout = 50;
        arduinoSerialInput.serialPort.Open();

arduinoSerialInput.StartSerialInputThread();
    }
    else
        throw new System.InvalidOperationException("Port is already opened,
close port to open a new one.");
}

/// <summary>
/// Closes the serial port.
///<exception cref="InvalidOperationException">Thrown if port is already
closed.</exception>
/// </summary>
public static void CloseSerialPort()
{
    ArduinoInput arduinoSerialInput = ArduinoInput.GetArduinoInput ();
    // if port is open set applicable flags to closed value, end read
    // thread, and close port, else throw exception.
    if (arduinoSerialInput.serialPort != null)
    {
        arduinoSerialInput.runReadThread = false;
        // sleep to allow vector parse thread to end.
        Thread.Sleep (1);
        if (arduinoSerialInput.serialPort != null)
        {
            arduinoSerialInput.serialPort.Close ();
            arduinoSerialInput.serialPort = null;
        }
    }
    else
        throw new System.InvalidOperationException("Port is already
closed.");
} public static void SendData(string data)
{
    ArduinoInput arduinoSerial= ArduinoInput.GetArduinoInput();

arduinoSerial.serialPort.Write(data);
}

/// <summary>
/// Gets the value of the dimension of the sensor requested.
/// </summary>
/// <returns>The value of the desired dimension of the sensor Vector.</returns>
/// <param name="sensorNumber">Number of the sensor to request.</param>
/// <param name="dimension">Dimension of the sensor to request.(x/y/z)</param>
/// <exception cref="ArgumentOutOfRangeException">Dimension and sensor number must
be in
/// valid range</exception>
/// <exception cref="IOException">Port must be open to read</exception>>
/// <exception cref="TimeoutException">Timeout on last read from
sensors</exception>
public static float GetSensorValue(int sensorNumber, char dimension)
{
    ArduinoInput arduinoSerialInput = ArduinoInput.GetArduinoInput();
    // Ensure open serial port
    if (arduinoSerialInput.serialPort.IsOpen)
    {
        // Ensure valid arguments
```

FIG. 10B

```
                                    if (sensorNumber < arduinoSerialInput.sensors.Length &&
sensorNumber >= 0)
                                    {
                                            float returnVal;
                                            switch (dimension)
                                            {
                                                    // Case X dimension, both upper and lower are valid
                                            case 'x':
                                            case 'X':
                                                    returnVal =
arduinoSerialInput.sensors[sensorNumber].x;
                                                    break;
                                                    // Case Y dimension
                                            case 'y':
                                            case 'Y':
                                                    returnVal =
arduinoSerialInput.sensors[sensorNumber].y;
                                                    break;
                                                    // Case Z dimension
                                            case 'z':
                                            case 'Z':
                                                    returnVal =
arduinoSerialInput.sensors[sensorNumber].z;
                                                    break;
                                            default:
                                                    throw new
System.ArgumentOutOfRangeException("Dimension must be character x, y, or z.");
                                            }
                                            // If value in acceptable range (0-360) return it, else
timeout so throw exception
                                            if (returnVal != -1)
                                                    return returnVal;
                                            else
                                                    throw new System.TimeoutException("Timeout on read
from sensor.");
                                    }
                                    else
                                            throw new System.ArgumentOutOfRangeException("Sensor
requested does not exist.");
                            }
                            else
                                    throw new IOException("Port is not open, open port before trying to
read values.");
                    }
                    public static int getCurReadNumber()
                    {
                            return ArduinoInput.GetArduinoInput().sensorReadCount;
                    }

// creates the thread
                    private void StartSerialInputThread()
                    {
                            if (serialThread == null)
                            {
                                    runReadThread = true;
                                    serialThread = new Thread(new ThreadStart(parseVector));
                                    serialThread.Start();
                            }
                    }

// Thread which updates sensor vectors with incoming values.
                    private void parseVector ()
                    {
                            while (runReadThread)
                            {
                                    // Ensure open serial port
                                    if (serialPort.IsOpen)
                                    {
                                            // The value read from the serial input is split into an
array of strings based on the delimiter
                                            // character, and the array of strings is returned to the
ParsedString array for reading into
                                            // the sensor vectors.

// catching timeouts
                                            try
                                            {
                                                    string inputRaw = serialPort.ReadTo("\n");
                                                    // Parse input buffer
                                                    // Array strings parsed from arduino input
```

FIG. 10C

```
                                string[] parsedString;
                                parsedString = inputRaw.Split(DELIM_CHARACTER);
                                // Set values of sensors
                                for (int i = 0; i < 4; i ++)
                                {
                                        float.TryParse(parsedString[3*i], out
sensors[i].x);
                                        float.TryParse(parsedString[3*i+1], out
sensors[i].y);
                                        float.TryParse(parsedString[3*i+2], out
sensors[i].z);
                                }
                                sensorReadCount ++;
                        }
                        catch (System.TimeoutException)
                        {
                                //If time out occurs - due to lost connection or any
other reason - set values in vector to
                                // -1 and check on read. If -1, throw timeout
exception from static read method.
                                for (int i = 0; i < 3; i ++)
                                {
                                        sensors[i].x = -1;
                                        sensors[i].y = -1;
                                        sensors[i].z = -1;
                                }
                        }
                }
                // sleep thread for efficiency, less then a frame for smooth
movement.
                        Thread.Sleep(10);
                }
        }
        /// <summary>
        /// Close serial port and clean up
        /// </summary>
        ~ArduinoInput()
        {
                ArduinoInput.CloseSerialPort();
        }
        }
}
```

FIG. 10D

METHOD FOR TRANSMITTING SIGNALS BETWEEN WEARABLE MOTION CAPTURE UNITS AND A VIDEO GAME ENGINE

FIELD OF THE INVENTION

The present invention relates generally to a method for increasing motion-based interactivity between video games and players. More specifically, the present invention is a method for transmitting signals between wearable motion capture units and a video game engine.

BACKGROUND OF THE INVENTION

The advancement of the video game industry has led to the emergence of new technologies that increase interactivity between video games and players. Virtual reality provides an immersive experience that places players into lifelike three-dimensional environments. Aside from being able to experience a virtual environment, players are typically able to interact with the environment as well. In addition to virtual reality, motion-based technology has become increasingly prevalent in video games. Players are typically required to wear or hold an electronic device that is capable of capturing their body movements and translating the body movements into corresponding actions within the video games. Motion-based technology greatly enhances the physical aspect of video games that traditionally only required physical user input through a controller device.

The present invention is a method for transmitting signals between wearable motion capture units and a game engine. This enables a player's movements to be captured and translated to the game engine. As such, the player's movements are able to influence the environment rendered by the game engine. The player additionally receives haptic feedback through the wearable motion capture units based on events transpiring within the environment rendered by the game engine.

BRIEF DESCRIPTION OF THE DRAWINGS

FIG. 8A is a code for the master microcontroller (Arduino).

FIG. 8B is a continuation of the code for the master microcontroller (Arduino).

FIG. 9A is a code for the plurality of slave microcontrollers (Arduino).

FIG. 9B is a continuation of the code for the plurality of slave microcontrollers (Arduino).

FIG. 9C is a continuation of the code for the plurality of slave microcontrollers (Arduino).

FIG. 9D is a continuation of the code for the plurality of slave microcontrollers (Arduino).

FIG. 9E is continuation of the code for the plurality of slave microcontrollers (Arduino).

FIG. 10A is a code for the game engine (Unity).

FIG. 10B is a continuation of the code for the game engine (Unity).

FIG. 10C is a continuation of the code for the game engine (Unity).

FIG. 10D is a continuation of the code for the game engine (Unity).

DETAIL DESCRIPTIONS OF THE INVENTION

All illustrations of the drawings are for the purpose of describing selected versions of the present invention and are not intended to limit the scope of the present invention.

Figure 1A:
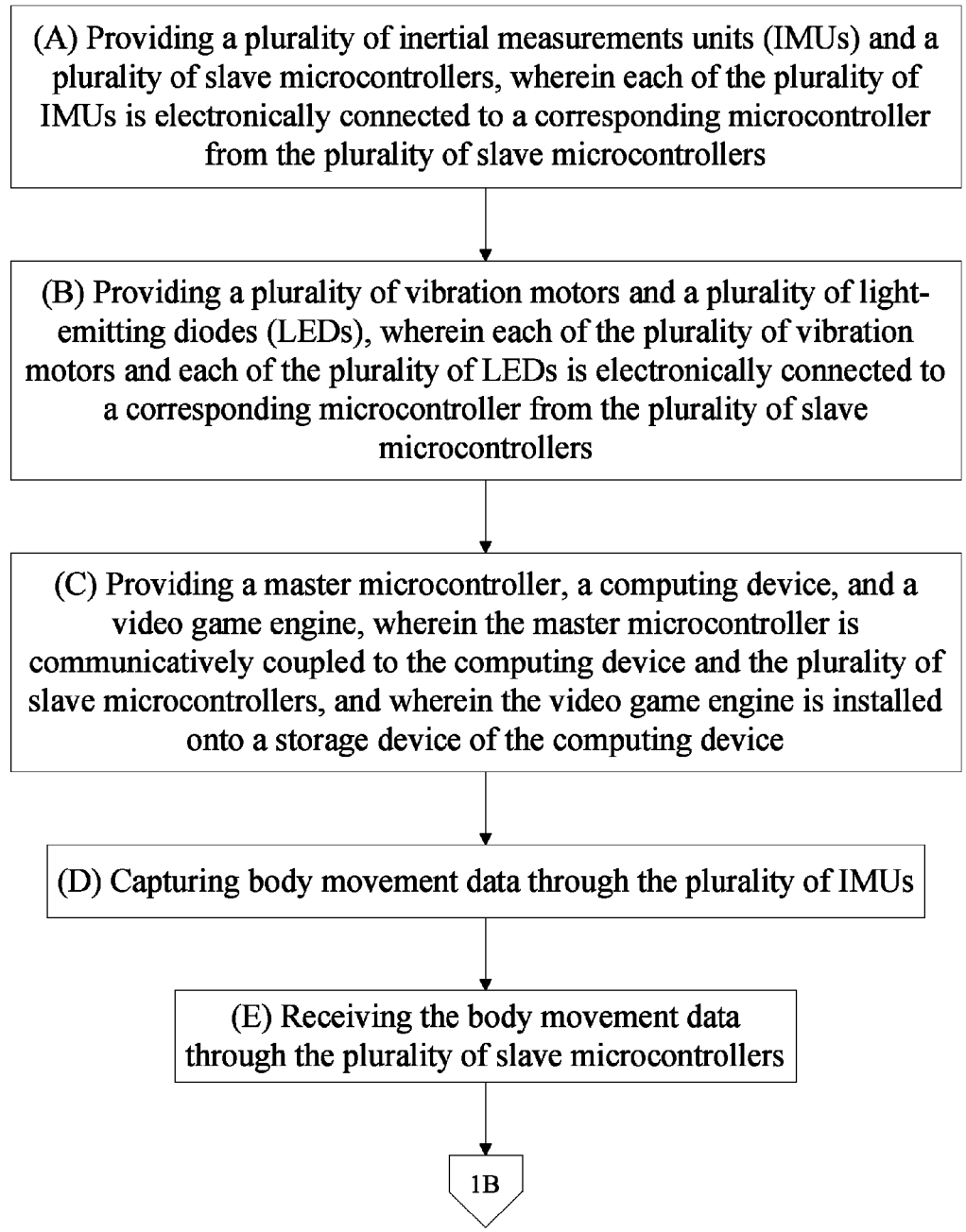
FIG. 1A is a flowchart illustrating the overall process that is followed by the present invention.
Figure 1B:
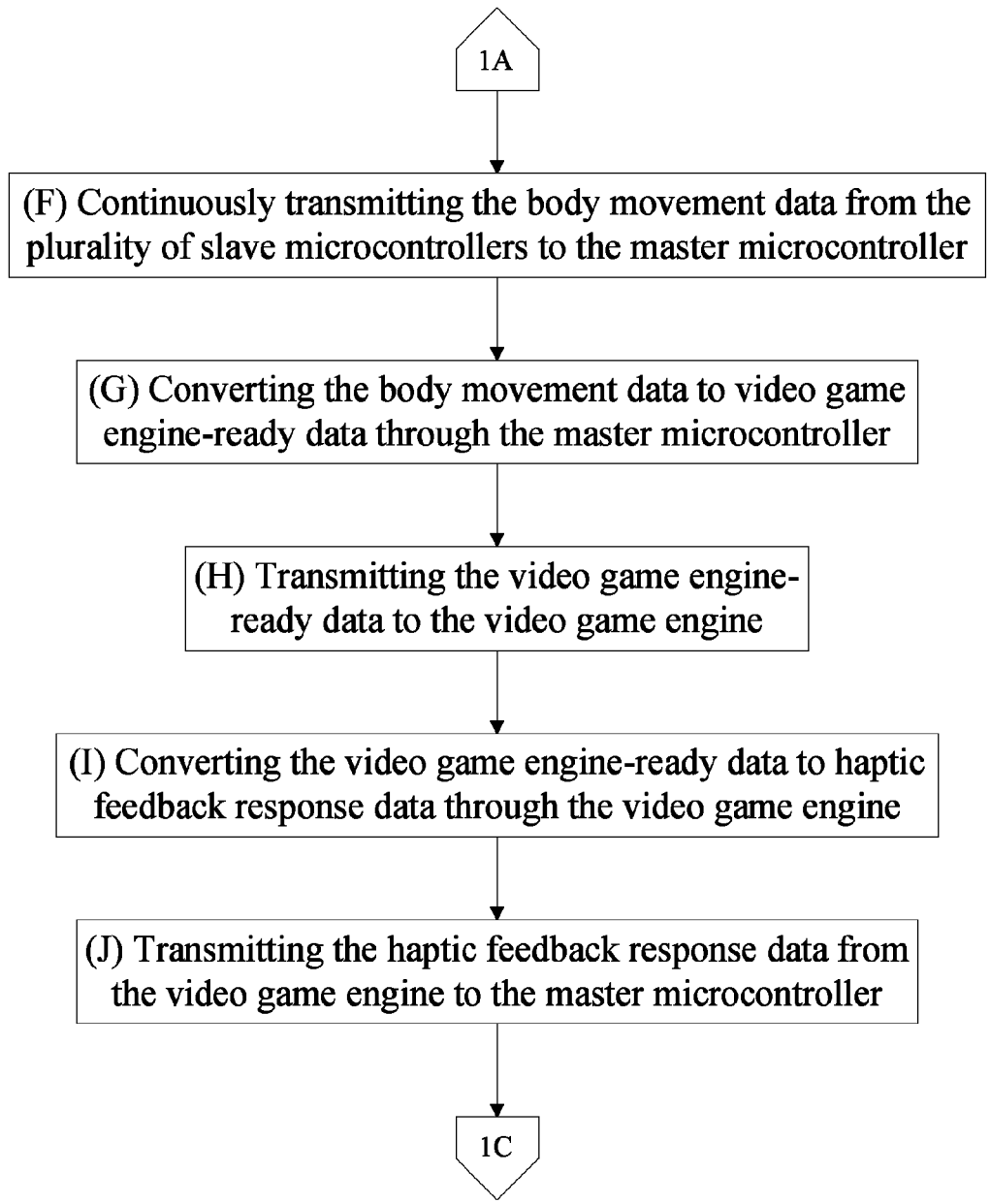
FIG. 1B is a continuation of the flowchart illustrated in FIG. 1A.
Figure 1C:
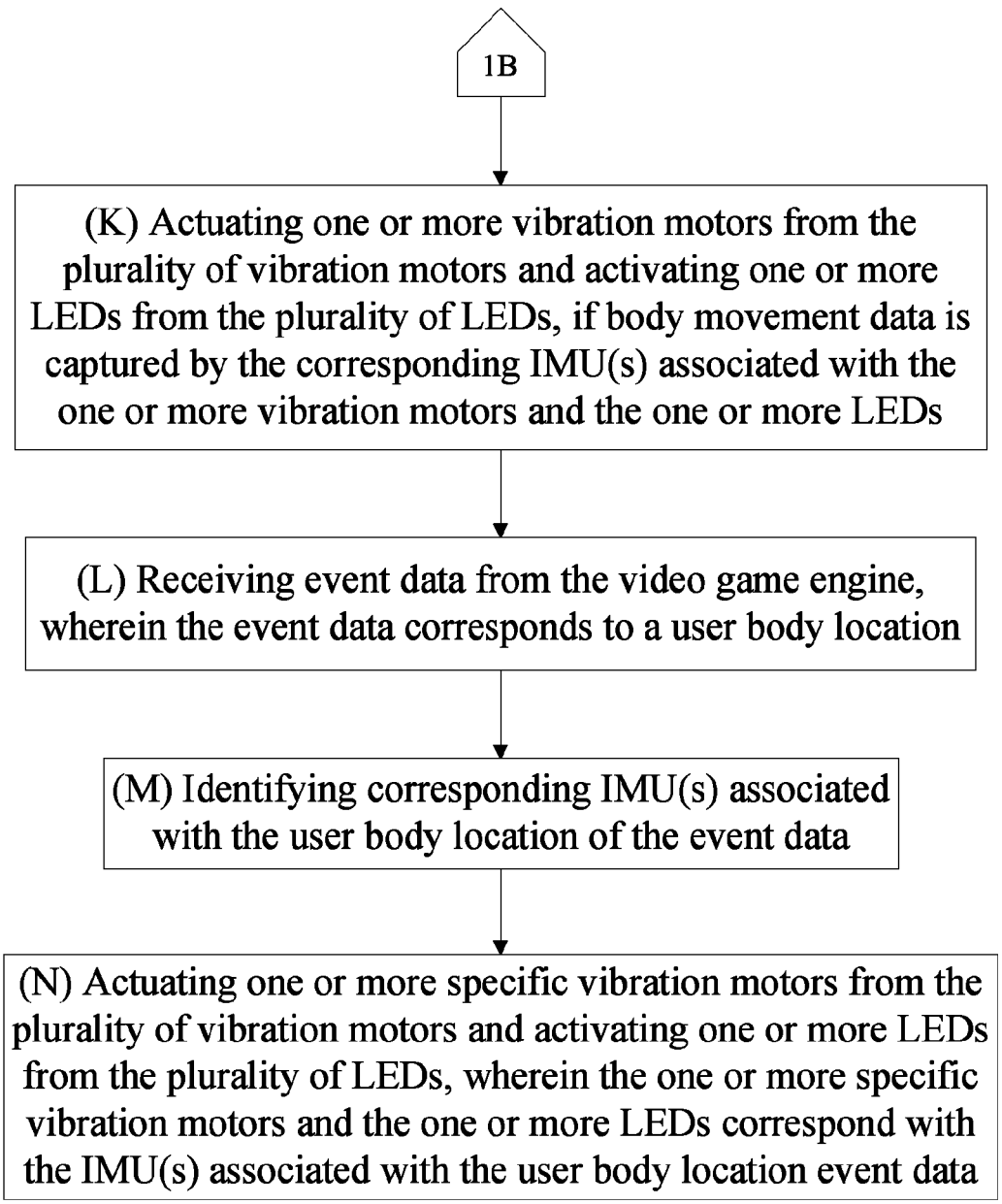
FIG. 1C is a continuation of the flowcharts illustrated in FIG. 1A and FIG. 1B.
Figure 2:
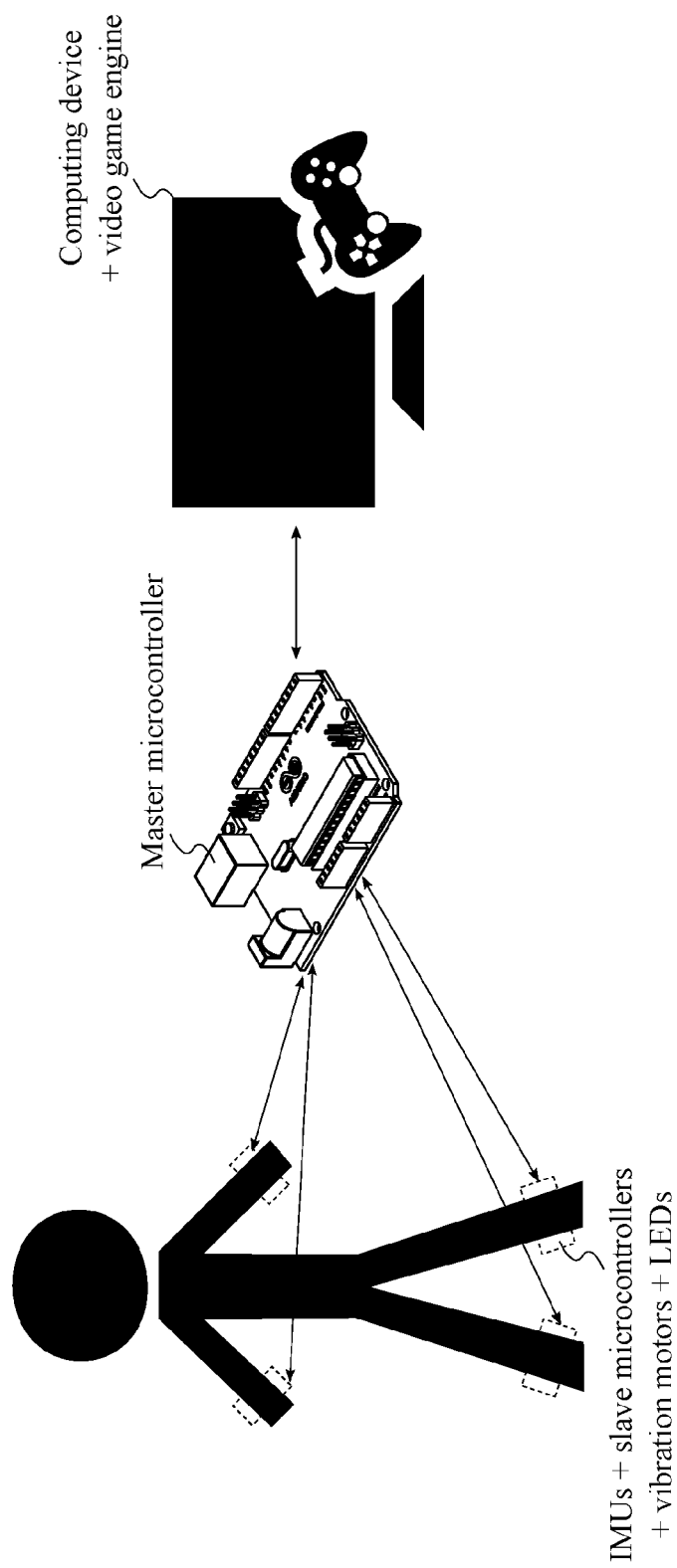
FIG. 2 is a diagrammatic overview of the present invention.
Figure 3:
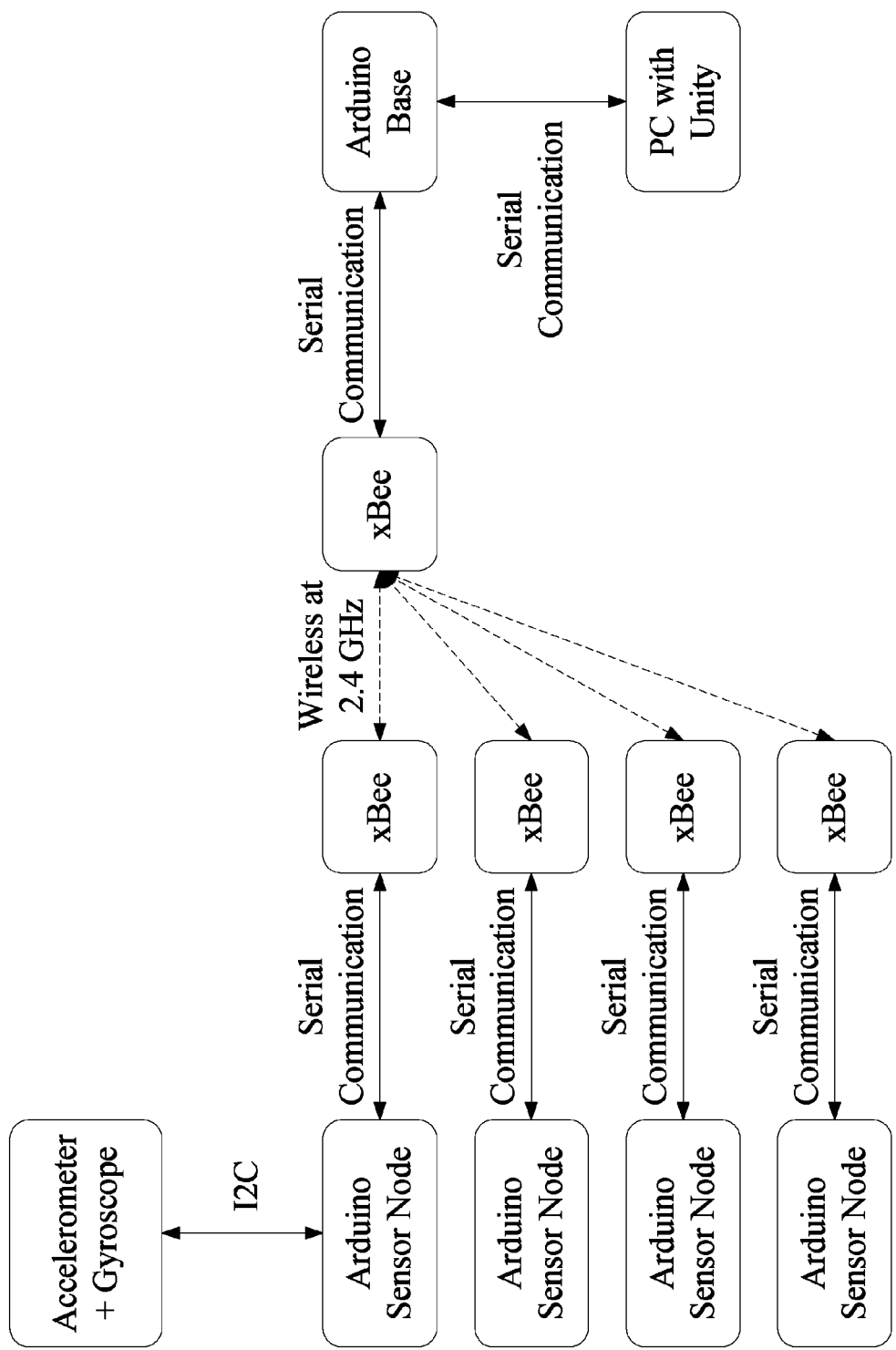
FIG. 3 is an additional diagrammatic overview of the present invention.

The present invention is a method for transmitting signals between wearable motion capture units and a video game engine. The overall process that is followed by the present invention is shown in FIG. 1A, FIG. 1B, and FIG. 1C while diagrammatic overviews of the present invention are shown in FIG. 2 and FIG. 3. Secondary processes that are followed by the present invention are shown in FIGS. 4-7.

Figure 5:
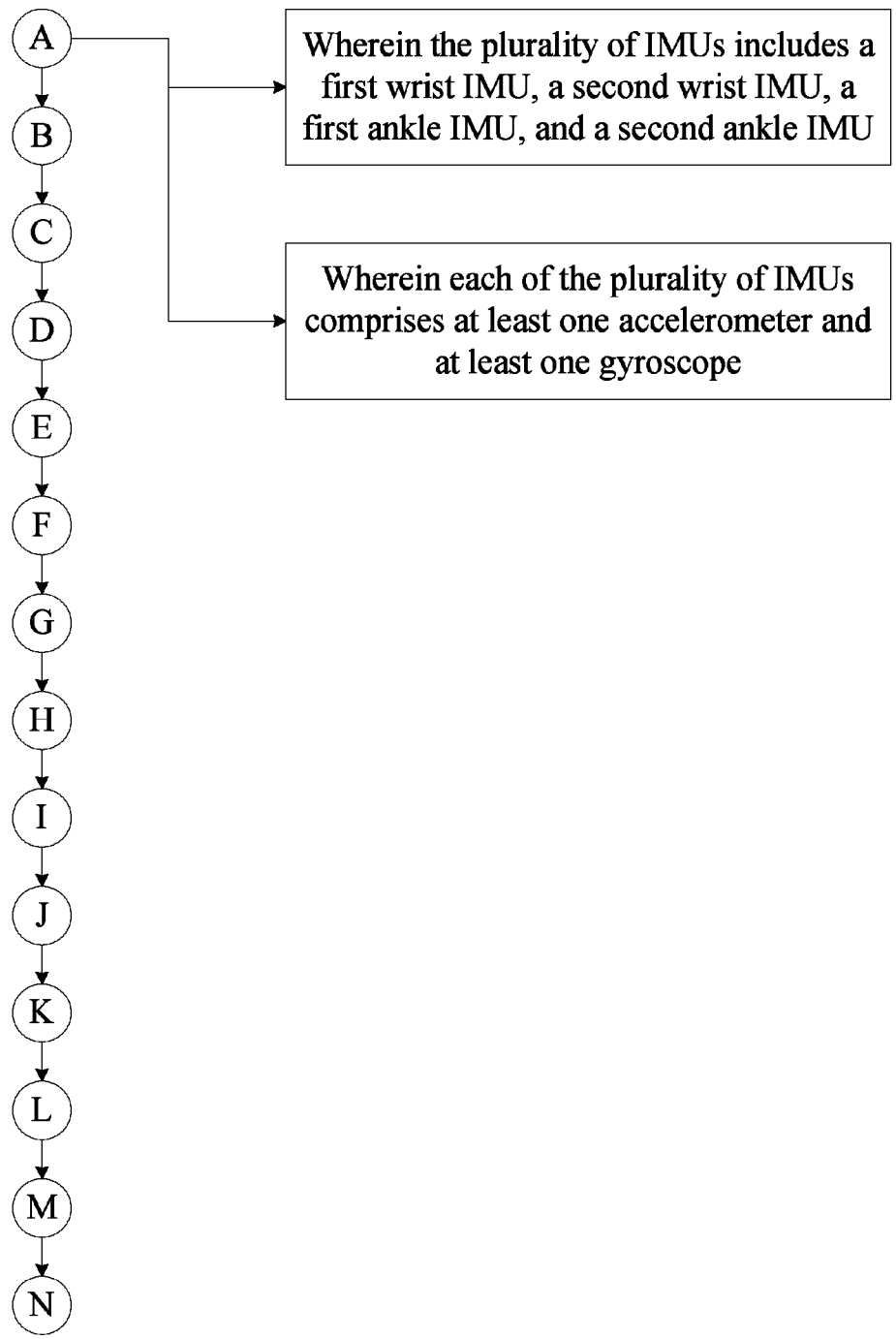
FIG. 5 is a flowchart of the overall process that is followed by the present invention and additional details for the plurality of IMUs.

With reference to FIG. 1A, the present invention makes use of a plurality of inertial measurement units (IMUs) and a plurality of slave microcontrollers. The plurality of IMUs is worn on the user's body and is able to capture body movement data based on the user's movements. The body movement data corresponds to movements within a video game engine. Each of the plurality of IMUs is electronically connected to a corresponding microcontroller from the plurality of slave microcontrollers. As such, the plurality of IMUs may be worn on multiple user body locations to more accurately capture the user's body movement data. As shown in FIG. 2 and FIG. 5, in the preferred embodiment of the present invention, the plurality of IMUs includes a first wrist IMU, a second wrist IMU, a first ankle IMU, and a second ankle IMU, enabling body movement data to be captured from these user body locations. However, the plurality of IMUs may include additional IMUs for capturing body movement data from additional user body locations. Fewer IMUs may be utilized as well. Again with reference to FIG. 1A, body movement data captured by the plurality of IMUs is transmitted to the plurality of slave microcontrollers. The present invention additionally utilizes a plurality of vibration motors and a plurality of light-emitting diodes (LEDs). The plurality of vibration motors and the plurality of LEDs provide the user with haptic and visual feedback from the video game engine based on the user body movement data as well as events that occur within the video game engine. Each of the plurality of vibration motors and each of the plurality of LEDs is electronically connected to a corresponding microcontroller from the plurality of slave microcontrollers. This enables the user to receive feedback from the plurality of vibration motors and the plurality of LEDs on one or more user body locations on which the plurality of IMUs is worn. Finally, a master microcontroller and a computing device are utilized by the present invention. The video game engine is installed onto a storage device of the computing device. The master microcontroller is communicatively coupled to the computing device and the plurality of slave microcontrollers. This may be accomplished via a wireless or wired connection between the master microcontroller and the computing device. The master microcontroller enables feedback and two-way communication between the video game engine and the plurality of slave microcontrollers. In the preferred embodiment of the present invention, the master microcontroller is an Arduino microcontroller board, although similar microcontroller devices may be utilized. Additionally, each of the plurality of slave microcontrollers is preferably an Arduino microcontroller board as well.

Again with reference to FIG. 1A and FIG. 5, body movement data is captured through the plurality of IMUs. The plurality of IMUs is able to capture the velocity and orientation of one or more user body locations as the user moves. In the preferred embodiment of the present invention, each of the plurality of IMUs comprises at least one accelerometer and at least one gyroscope. The at least one accelerometer is able to detect magnitude and direction of proper acceleration experienced by the user body locations during movement. The roll and pitch of each of the plurality of IMUs are determined using the following equations:

$$\text{Roll} = \arctan\left(\frac{x}{z}\right)$$
$$\text{Pitch} = \arctan\left(\frac{y}{z}\right)$$

The variables x, y, and z are indicative of acceleration on the x, y, and z axes while roll and pitch are indicative of rotation on the x-axis and y-axis, respectively. Because yaw cannot be determined utilizing an accelerometer, a device such as a magnetometer must be utilized if rotation about the z axis is desired. The at least one gyroscope functions in conjunction with the at least one accelerometer and is able to account for orientation as well as rotation of the user body locations as the user moves. The position of each of the plurality of IMUs is determined using the following equation:

$$P(1)=P(0)+[V(1)]*dt$$

The variable P(1) is the current position in degrees while P(0) is the previous position (position during the previous reading). The variable V(1) is the angular velocity while dt is the change in time between the previous reading and the current reading.

With reference to FIG. 1A and FIG. 1B, after being captured by the plurality of IMUs, the body movement data is received through the plurality of slave microcontrollers. Because each of the plurality of IMUs is electronically connected to a corresponding microcontroller from the plurality of slave microcontrollers, the plurality of slave microcontrollers is able to receive body movement data from one or more user body locations on which the plurality of IMUs is worn. The body movement data is then continuously transmitted from the plurality of slave microcontrollers to the master microcontroller. The master microcontroller is thus able to aggregate the body movement data from multiple user body locations. The body movement data is converted to video game engine-ready data through the master microcontroller in order to allow the video game engine to read and interpret the body movement data. In the preferred embodiment of the present invention, conversion of the body movement data to the video game engine-ready data is done through a custom program. The video game engine-ready data is then transmitted to the video game engine. The user body movement data may thus be represented in the video game engine, for example, by the user's in-game avatar performing the same movements as the user body movement data.

Further referencing FIG. 1A and FIG. 1B, after the video game engine-ready data is transmitted to the video game engine, the video game engine-ready data is converted to haptic and visual feedback response data through the video game engine. In the preferred embodiment of the present invention, the video game engine-ready data is converted to the haptic and visual feedback response data through another custom program. The haptic and visual feedback response data enables the plurality of vibration motors and the plurality of LEDs to provide haptic and visual feedback to the user as designated by the video game engine. The haptic and visual feedback response data is then transmitted from the video game engine to the master microcontroller. The master microcontroller is able to generate the appropriate response from the plurality of vibration motors and the plurality of LEDs based on the haptic and visual feedback response data. This is accomplished by the master microcontroller by interpreting the haptic and visual feedback response data through an additional custom program.

With reference to FIG. 1C, one or more vibration motors from the plurality of vibration motors is actuated and one or more LEDs from the plurality of LEDs is activated if body movement data is captured by the corresponding IMU(s) associated with the one or more vibration motors and the one or more LEDs. Within the context of the video game engine, the actuation of the one or more vibration motors and activation of the one or more LEDs is purely a haptic and visual response to the user body movement rather than a response to an in-game event within the video game engine.

With further reference to FIG. 1C, the present invention additionally allows for a haptic and visual response to an in-game event within the video game engine. In this case, event data corresponding to a user body location is received from the video game engine. More specifically, the event data corresponds to an in-game event that elicits a haptic and visual response to a user body location through the plurality of vibration motors and the plurality of LEDs. Corresponding IMU(s) associated with the user body location of the event data are then identified to determine the correct vibration motors from the plurality of vibration motors to actuate and the correct LEDs from the plurality of LEDs to activate. One or more specific vibration motors from the plurality of vibration motors are actuated and one or more LEDs from the plurality of LEDs are activated. The one or more specific vibration motors and the one or more LEDs correspond with the IMU(s) associated with the user body location event data. An example of event data that may generate a haptic and visual response is being hit by an opponent during an in-game boxing match.

Figure 4:
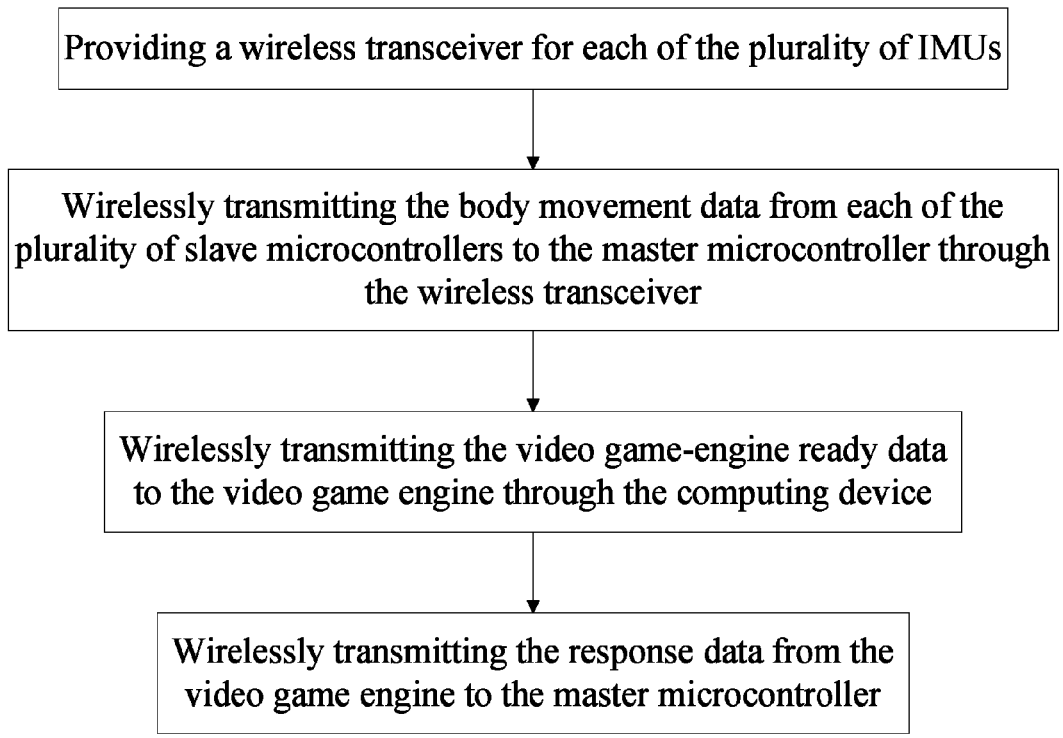
FIG. 4 is a flowchart of the secondary process that is followed by the present invention.

As seen in FIG. 4, each of the plurality of IMUs is able to utilize a wireless transceiver to enable wireless communication between the plurality of slave microcontrollers and the master microcontroller. The body movement data is thus wirelessly transmitted from each of the plurality of slave microcontrollers to the master microcontroller through the wireless transceiver. The elimination of a wired connection between the plurality of slave microcontrollers and the master microcontroller eliminates any potential hindrances to the user's movement. Additionally, the video game-engine ready data is wirelessly transmitted to the video game engine through the computing device, further eliminating the need for any sort of wired connection. The haptic and visual feedback response data is wirelessly transmitted from the video game engine to the master microcontroller, enabling fully wireless communication throughout the method of the present invention. In the preferred embodiment of the present invention, the wireless transceiver is an xBee module, although similar wireless communication protocols may be utilized as well.

Figure 6:
FIG. 6 is a flowchart of the secondary process that is followed by the present invention.

As shown in FIG. 6, while wireless communication through the wireless transceiver is preferred, a connection wire for the master microcontroller may be utilized to connect the master microcontroller to the computing device. In this case, the master microcontroller is electronically connected to the computing device through the connection wire. This may be useful for a variety of tasks such as adjusting the settings for the master microcontroller through the computing device. The connection wire may utilize Universal Serial Bus (USB) or similar protocol.

Figure 7:
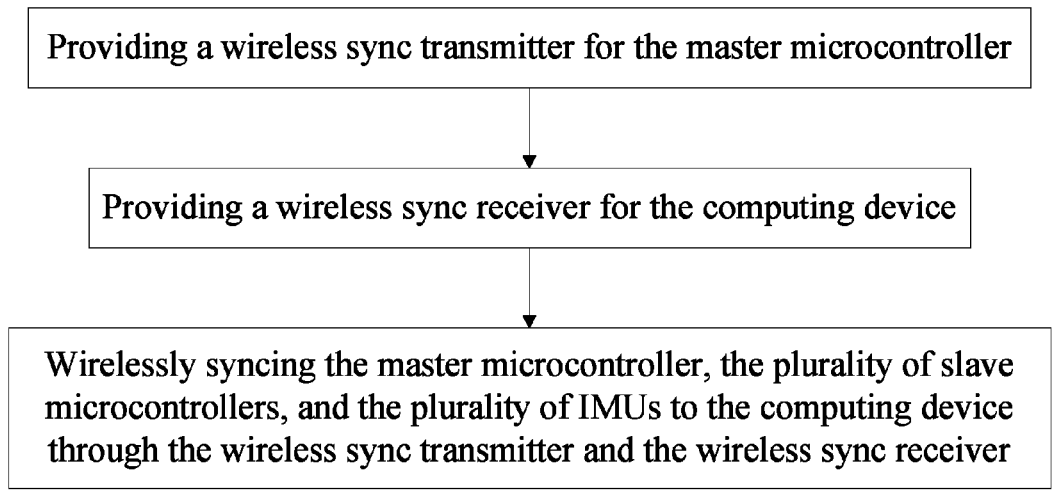
FIG. 7 is a flowchart of the secondary process that is followed by the present invention.

With reference to FIG. 7, when first associating the master microcontroller, the plurality of slave microcontrollers, and the plurality of IMUs to the computing device, a wireless sync transmitter for the master microcontroller and a wireless sync receiver for the computing device are utilized. The master microcontroller, the plurality of slave microcontrollers, and the plurality of IMUs may thus be associated with the computing device without the need for a physical connection. The master microcontroller, the plurality of slave microcontrollers, and the plurality of IMUs are wirelessly synced to the computing device through the wireless sync transmitter and the wireless sync receiver. This enables the plurality of IMUs to begin capturing and wirelessly transmitting the body movement data to the master microcontroller through the plurality of slave microcontrollers. The master microcontroller is then able to wirelessly transmit the video game engine-ready data to the video game engine through the computing device.

Although the present invention has been explained in relation to its preferred embodiment, it is understood that many other possible modifications and variations can be made without departing from the spirit and scope of the present invention as hereinafter claimed.

What is claimed is:

1. A method for transmitting signals between wearable motion capture units and a video game engine, the method comprises the steps of:
   (A) providing a plurality of inertial measurement units (IMUs), a plurality of slave microcontrollers, a plurality of vibration motors, a plurality of light-emitting diodes (LEDs), a master microcontroller, a computing device, and a video game engine;
   (B) capturing body movement data through the plurality of IMUs;
   (C) receiving the body movement data through the plurality of slave microcontrollers;
   (D) continuously transmitting the body movement data from the plurality of slave microcontrollers to the master microcontroller;
   (E) converting the body movement data to video game engine-ready data through the master microcontroller;
   (F) transmitting the video game engine-ready data to the video game engine;
   (G) converting the video game engine-ready data to haptic and visual feedback response data through the video game engine;
   (H) transmitting the haptic and visual feedback response data from the video game engine to the master microcontroller;
   (I) actuating one or more vibration motors from the plurality of vibration motors and activating one or more LEDs from the plurality of LEDs, if body movement data is captured by the corresponding IMU(s) associated with the one or more vibration motors and the one or more LEDs;
   (J) receiving event data from the video game engine, wherein the event data corresponds to a user body location;
   (K) identifying corresponding IMU(s) associated with the user body location of the event data; and
   (L) actuating one or more specific vibration motors from the plurality of vibration motors and activating one or more LEDs from the plurality of LEDs, wherein the one or more specific vibration motors and the one or more LEDs correspond with the IMU(s) associated with the user body location event data.

2. The method for transmitting signals between wearable motion capture units and a video game engine as claimed in claim 1, wherein each of the plurality of IMUs is electronically connected to a corresponding microcontroller from the plurality of slave microcontrollers.

3. The method for transmitting signals between wearable motion capture units and a video game engine as claimed in claim 1, wherein each of the plurality of vibration motors and each of the plurality of LEDs is electronically connected to a corresponding microcontroller from the plurality of slave microcontrollers.

4. The method for transmitting signals between wearable motion capture units and a video game engine as claimed in claim 1, wherein the master microcontroller is communicatively coupled to the computing device and the plurality of slave microcontrollers, and wherein the video game engine is installed onto a storage device of the computing device.

5. The method for transmitting signals between wearable motion capture units and a video game engine as claimed in claim 1, the method comprises the steps of:
   providing a wireless transceiver for each of the plurality of IMUs;
   wirelessly transmitting the body movement data from each of the plurality of slave microcontrollers to the master microcontroller through the wireless transceiver;
   wirelessly transmitting the video game-engine ready data to the video game engine through the computing device; and
   wirelessly transmitting the haptic and visual feedback response data from the video game engine to the master microcontroller.

6. The method for transmitting signals between wearable motion capture units and a video game engine as claimed in claim 1, wherein the plurality of IMUs includes a first wrist IMU, a second wrist IMU, a first ankle IMU, and a second ankle IMU.

7. The method for transmitting signals between wearable motion capture units and a video game engine as claimed in claim 1, wherein each of the plurality of IMUs comprises at least one accelerometer and at least one gyroscope.

8. The method for transmitting signals between wearable motion capture units and a video game engine as claimed in claim 1, the method comprises the steps of:
   providing a connection wire for the master microcontroller; and
   electronically connecting the master microcontroller to the computing device through the connection wire.

9. The method for transmitting signals between wearable motion capture units and a video game engine as claimed in claim 1, the method comprises the steps of:
   providing a wireless sync transmitter for the master microcontroller;

providing a wireless sync receiver for the computing device; and wirelessly syncing the master microcontroller, the plurality of slave microcontrollers, and the plurality of IMUs to the computing device through the wireless sync transmitter and the wireless sync receiver.

\* \* \* \* \*